Jan. 29, 1929. 1,700,296
N. MILLER ET AL
TRAFFIC DIRECTION SIGNAL
Filed Oct. 25, 1927  3 Sheets-Sheet 1
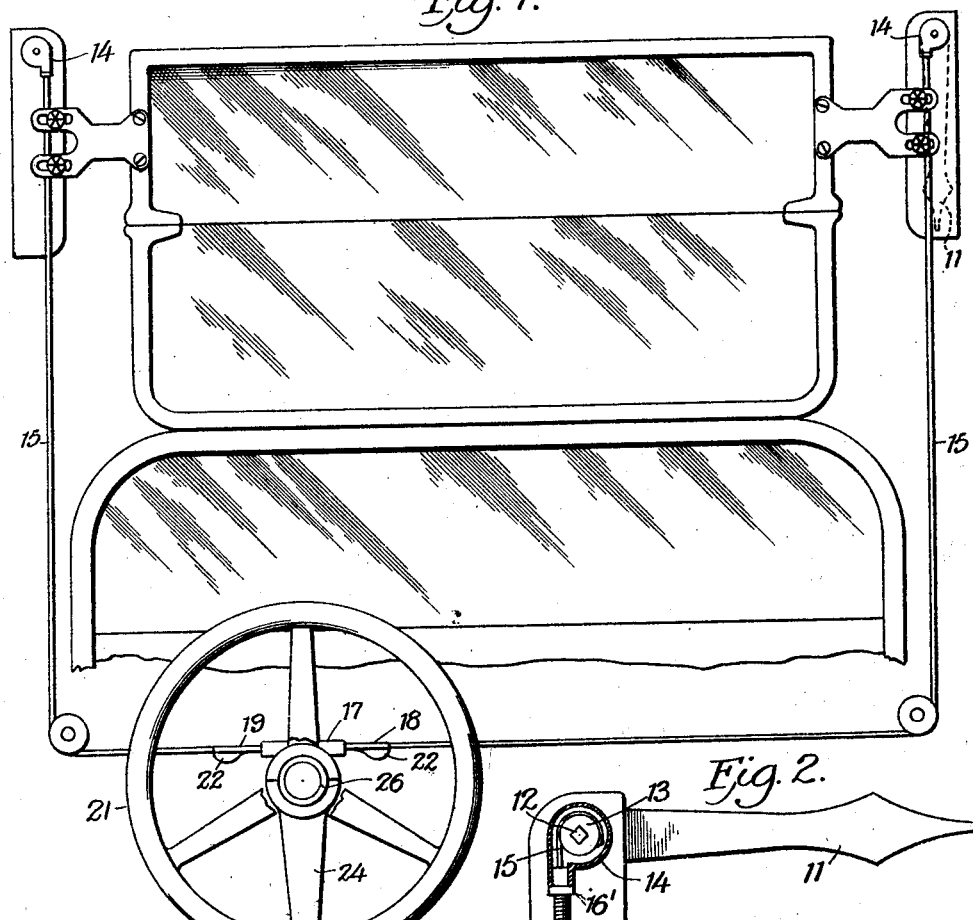
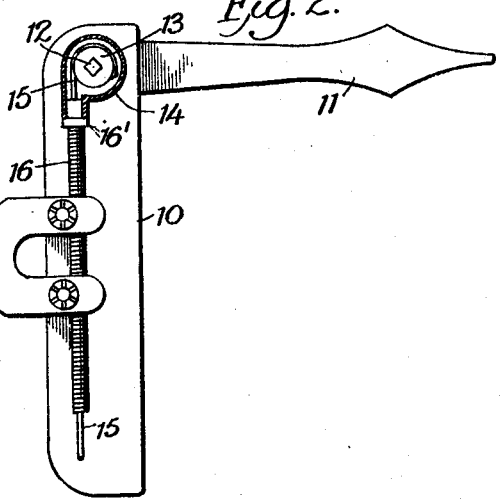
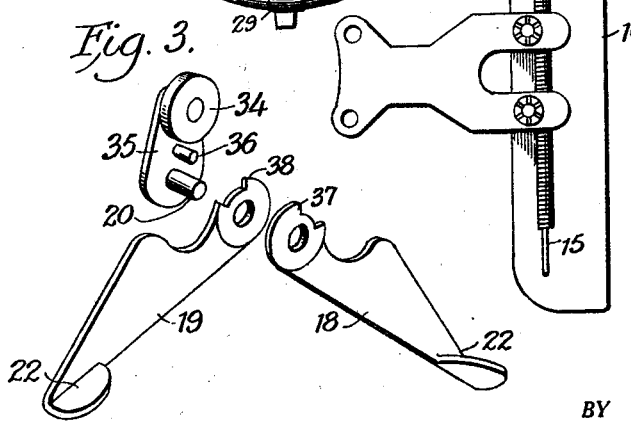
INVENTOR.
Nickoli Miller,
William Bistram,
BY James F. Duhamel,
ATTORNEY.

Jan. 29, 1929.
N. MILLER ET AL
1,700,296
TRAFFIC DIRECTION SIGNAL
Filed Oct. 25, 1927
3 Sheets-Sheet 2
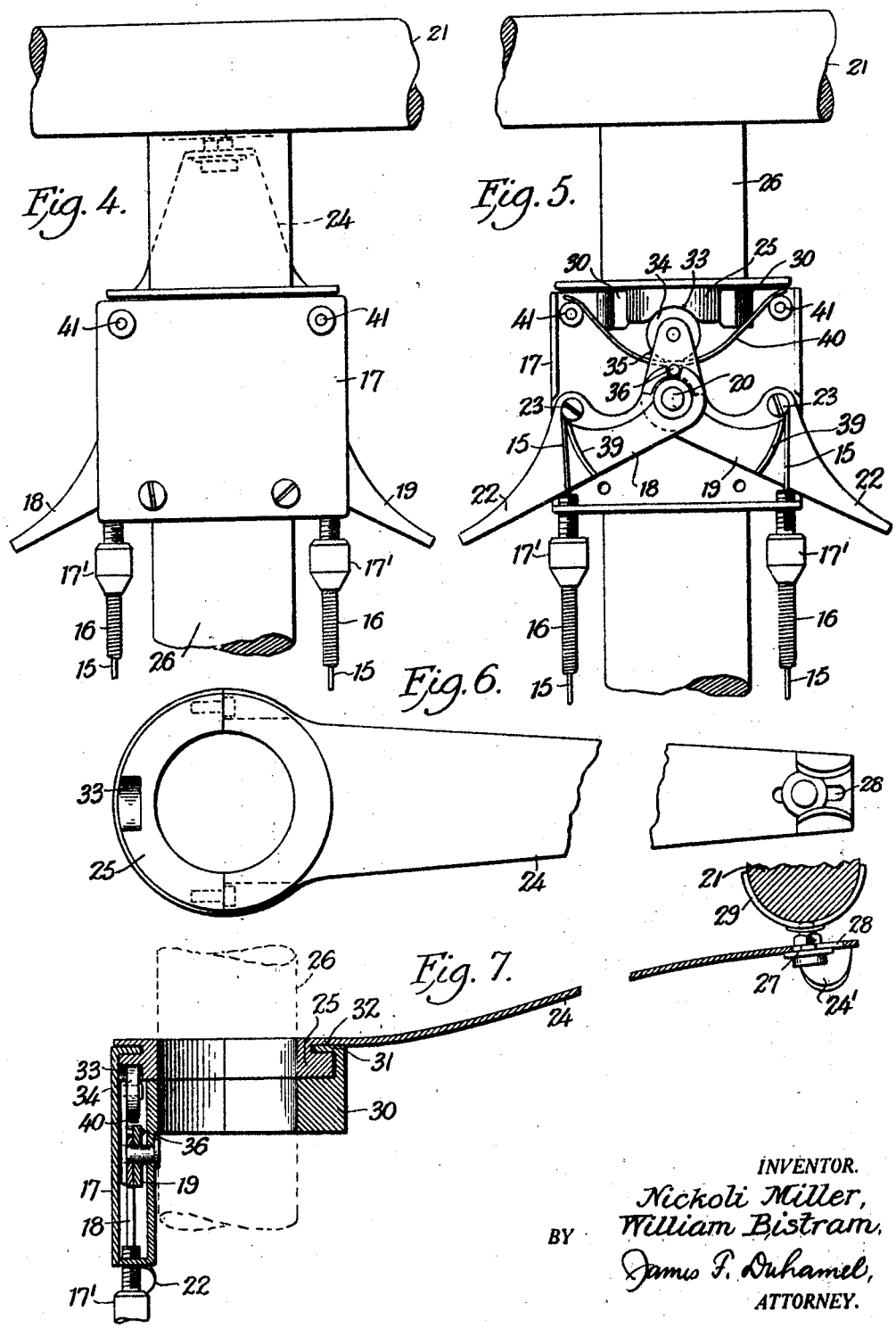
INVENTOR.
Nickoli Miller,
William Bistram,
BY
James F. Duhamel,
ATTORNEY.

Jan. 29, 1929.
N. MILLER ET AL
1,700,296
TRAFFIC DIRECTION SIGNAL
Filed Oct. 25, 1927     3 Sheets-Sheet 3
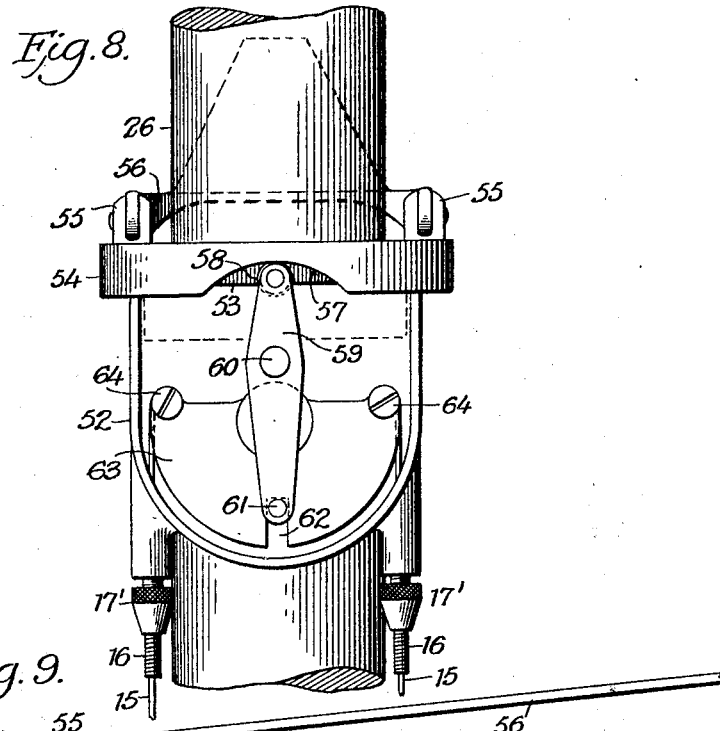
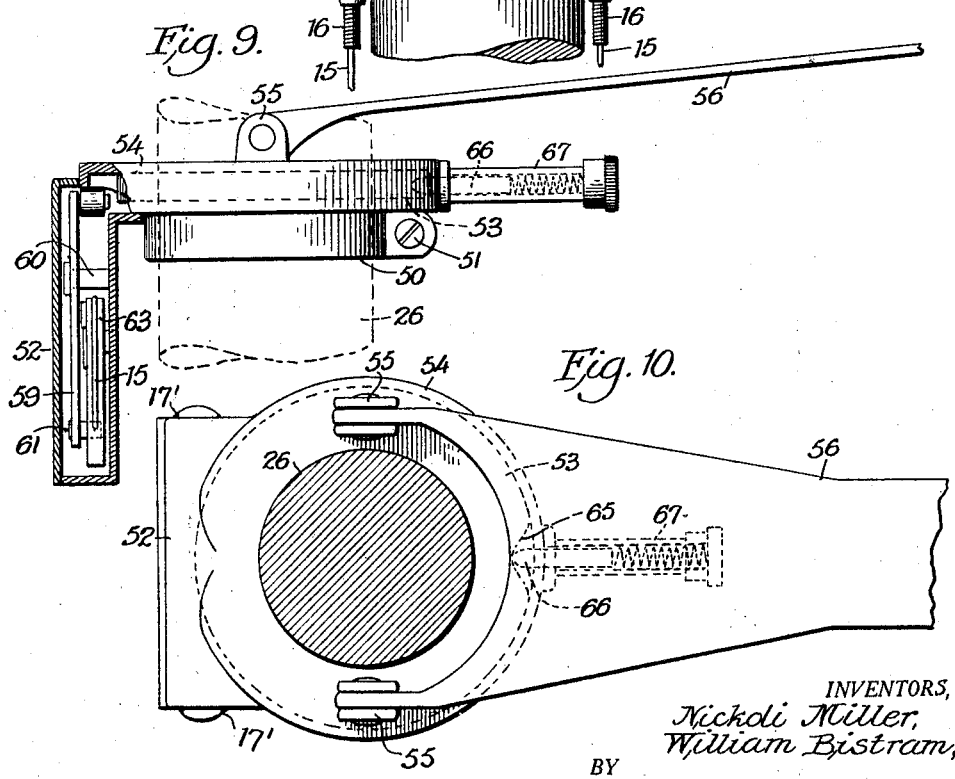
INVENTORS,
Nickoli Miller,
William Bistram,
BY
James P. Duhamel,
ATTORNEY.

Patented Jan. 29, 1929.

1,700,296

UNITED STATES PATENT OFFICE.

NICKOLI MILLER AND WILLIAM BISTRAM, OF NEW YORK, N. Y.

TRAFFIC-DIRECTION SIGNAL.

Application filed October 25, 1927. Serial No. 228,612.

This invention relates to traffic direction signals for vehicles and its object is to provide means within the range of the driver's hands, while he still controls the steering wheel, means for operating semaphore arms pivoted at the sides of the vehicle and adapted to indicate the direction of the movement of the vehicle.

While the throwing of the semaphores may be manual and before any attempt is made to change the course of the vehicle, the arms are thrown automatically when the steering wheel is turned and certain mechanism is provided with this object in view.

These and other details and objects of the invention are more fully described in the following specification, set forth in the appended claims and illustrated in the acompanying drawings, wherein:

Figure 1 is a diagrammatic view showing the connection between the steering control and the semaphore arms.

Fig. 2 is an elevation of one of the semaphores partly in section and showing the arm elevated.

Fig. 3 is a detail of the operating levers with the parts separated.

Fig. 4 shows the position of the operating box on the steering shaft column.

Fig. 5 is an elevation of the interior of the operating box.

Fig. 6 is a bottom plan view of the connecting arm and lever operating cam.

Fig. 7 is a longitudinal sectional view through the arm and operating box.

Figs. 8, 9 and 10 show a modified construction.

The device hereinafter described is an improvement on the patent granted to one of the applicants, Nickoli Miller, October 8th, 1918, and Numbered 1,281,192, for traffic-direction signals and in which semaphores located at each side of a vehicle are employed and displayed by the actuation of a lever operated by the foot of the driver through the medium of a flexible element.

In the present invention in addition to the above the said lever is also actuated automatically by the turning of the steering wheel and its manual operating feature may be within the grasp of the driver while he operates the steering wheel.

In the drawings casings 10 for the semaphores are shown secured at each side of the windshield, or may be secured to any other part of the front of a vehicle, and in the casings are pivoted the arms 11 and on the pivots 12 are secured drums 13 having housings 14. Around the drums 13 is wound the ends of flexible elements, preferably fine steel wires 15 contained within flexible tubings 16 to protect the wires and convey them to the operating box 17 where the other ends of the wires are connected with the operating levers 18 and 19 pivoted on a stud 20 secured to the box and the levers normally occupy the position shown in Figs. 4 and 5 but when it is desired to operate the semaphores manually the thumb of the hand that is grasping the steering wheel 21 may be extended downward and beneath the outer end 22 of the lever to raise the same and the wire 15, attached to the levers by the screw 23 is put under strain and the semaphore arm is raised.

When the steering wheel is operated to display the semaphore arm the same is effected by the means shown in Figs. 3, 5 and 7 where an arm 24 is provided at one end with a grooved hub 25 that encircles the steering shaft column 26 and whose outer end has a stud 27 adjustable in a slot 28 and adapted to enter a socket in a band 29 that is fitted around the steering wheel 21.

This band 29 provides for the ready attachment of the device to steering mechanisms without altering or marring the same and permits of the immediate attaching or release of the same.

Secured to the shaft column 26 is a collar 30 having an inwardly projecting flange 3, that fits into the groove 32 of the hub 25 and permits of the rotation of the hub without permitting its release. On the under side of the hub is a depression 33 in which rests a roller 34 carried by a crank arm 35 that is movable on the stud 20.

The hub 25 is thus virtually a cam that rocks the crank arm 35 when the arm 24 is actuated by the movement of the steering wheel and as the crank arm 35 moves its pin 36 acts upon the shoulder 37 or the shoulder 38 of one of the levers 18 or 19 (Fig. 3) and depressing the lever will put the wire secured thereto under strain and elevate its semaphore arm.

This latter action only takes place when the vehicle is making its turn and is ample warning of what course the vehicle is taking, but to ensure sufficient time in the warning the manual operation may be resorted to.

The stud 27 may be protected from rotation or displacement by the wings 24' and the ends of the flexible tubing 16 may be clamped in collars 16' at their entrances to the housings 14 and clamping nuts 17' may secure their ends to the box 17.

The levers 18 and 19 have bearing faces 39 below the attaching screws 23 to allow the wires to travel thereon to prevent the action of sharp corners and the twisting or kinking of the same.

The outer ends 22 of the operating levers are flattened and broadened to afford a ready means for grasping same and a spring 40 is located beneath pin 36 and supported by studs 41 to return arm 35 to its upright position.

Fig. 4 clearly shows the relation of the steering wheel to the box 17 and its attaching collar 30 and how the arm 24 is secured beneath the wheel and where it will not be a hinderance to the operating levers for the control of the engine, while in Fig. 6 the hub 25 is shown made in two pieces, as is the collar 30 for location on the steering shaft column and screws for uniting the sections.

It is obvious that the parts may be otherwise arranged or modified without departing from the essential features above described or from the scope of the appended claims.

A practical modified form of the manipulating mechanism is shown in Figs. 8, 9 and 10 where a collar 50 is clamped to the column 26 by the screw 51 and carries at its opposite side the depending box 52.

Fig. 8 is a front view of the modified control box with its cover removed.

Fig. 9 is a side view of the same partly in section.

Fig. 10 is a plan view of the modified form of manipulating means.

On the upper edge of the collar 50 is a flange 53 around which is located a hollow ring 54 having on its upper face the ears 55 to which is pivoted the arm 56 that is like to arm 24, above described, secured at its outer end to the steering wheel.

In that part of the ring 54 adjacent the box 52 is a depression 57 that constitutes a cam surface playing on a roller 58 at the upper end of a lever 59 that is pivoted to the box 52 at 60 and its lower end has a lateral stud 61 that plays in the slot 62 of a plate 63, also pivoted to the box.

To each side of the plate 63 and adapted to bear in grooves in the edges of the same are secured, by means of the screws 64, the wires 15 that pass out of the armor securing nuts 17'.

When the steering wheel is turned the cam surface 57 rocks the lever 59 so that in turn rocks the plate 63, taking up the wire that is connected with the semaphore and elevating same. The front edge of the flange 53 within the ring 54 has a notch 65 into which enters the spring-pressed detent 66 carried in the casing 67 projecting from the said ring. This detent forms a normal connection for the parts for ordinary conditions.

What we claim as new is:

1. In a traffic direction signals, the combination of a signal, a steering wheel of a vehicle, levers located in proximity to the steering wheel and adapted to be operated by the party holding the steering wheel, means connected with the steering wheel for operating one or the other of the levers independently, and flexible connections between the levers and the signal.

2. In traffic direction signals, the combination of a signal, a steering wheel, levers adjacent the steering wheel, means operated by the steering wheel for actuating the levers, means for returning the levers to their normal positions, and flexible connections between each lever and the signal.

3. In traffic direction signals, the combination of a signal, a steering wheel, levers pivoted adjacent the steering wheel, a crank arm adapted to actuate one or the other lever, a cam adapted to rock the crank arm, an arm carrying the cam and attached to and actuated by the steering wheel, and flexible connections from the levers to the said signal.

4. In traffic direction signals, the combination of a signal, a steering wheel, a steering column, a hub comprising a cam journalled on said column, an arm from the hub and attached to the steering wheel, a crank arm having anti-friction means and actuated by the cam, levers in the path of the crank arm and adapted to be moved independently by said crank arm, and flexible connections between said levers and the signal.

5. In traffic direction signals, the combination of signal, a steering wheel, a steering column, levers pivoted on the column, a cam journalled on the column, a lateral arm on the cam attached at its outer end to the steering wheel, a crank arm having a roller at its end for engagement with the cam, a pin on the crank arm, levers pivoted in the path of the pin to be actuated when the crank arm is swung by the cam, and flexible connections between the levers and the signal.

6. In traffic direction signals, the combination of a signal, a steering wheel, a steering column, a box secured to said column, a cam journalled on the said box and around the column, a lateral arm from the cam, a stud attaching the arm to the steering wheel, a band on the wheel and adapted to receive the stud, a crank arm pivoted in the box and engaged by the cam, levers pivoted adjacent the crank arm and having shoulders, a pin on the crank arm and adapted to engage one or the other of said shoulders when actuated by the cam, and protected wires connecting the levers with the signal.

In testimony whereof we hereunto affix our signatures.

NICKOLI MILLER.
WILLIAM BISTRAM.